United States Patent [19]

Boeckmann

[11] 4,451,706
[45] May 29, 1984

[54] TELEPHONE SUBSTATION TRANSMITTER MUTING CIRCUIT

[75] Inventor: Eduard F. B. Boeckmann, Huntsville, Ala.

[73] Assignee: GTE Automatic Electric Inc., Northlake, Ill.

[21] Appl. No.: 451,589

[22] Filed: Dec. 20, 1982

[51] Int. Cl.³ .............................................. H04M 1/00
[52] U.S. Cl. .................... 179/81 R; 179/99 H
[58] Field of Search .................. 179/81 R, 99 E, 99 H, 179/167

[56] References Cited

U.S. PATENT DOCUMENTS

| 3,794,774 | 2/1974 | Kemmerly et al. | 179/99 H X |
| 4,011,413 | 3/1977 | Phillips | 179/99 H X |
| 4,087,638 | 5/1978 | Hayes et al. | |
| 4,315,108 | 2/1982 | Hoffman et al. | |
| 4,406,926 | 9/1983 | Duncan | |

FOREIGN PATENT DOCUMENTS 2915774  10/1980  Fed. Rep. of Germany .... 179/81 R

Primary Examiner—Harold I. Pitts
Assistant Examiner—Keith E. George
Attorney, Agent, or Firm—Anthony Miologos; Peter Xiarhos

[57] ABSTRACT

A telephone substation transmitter muting circuit used in a substation having a hold function wherein, a transistor turns on connecting a muting network across the handset transmitter whenever the hold circuit is activated.

10 Claims, 1 Drawing Figure

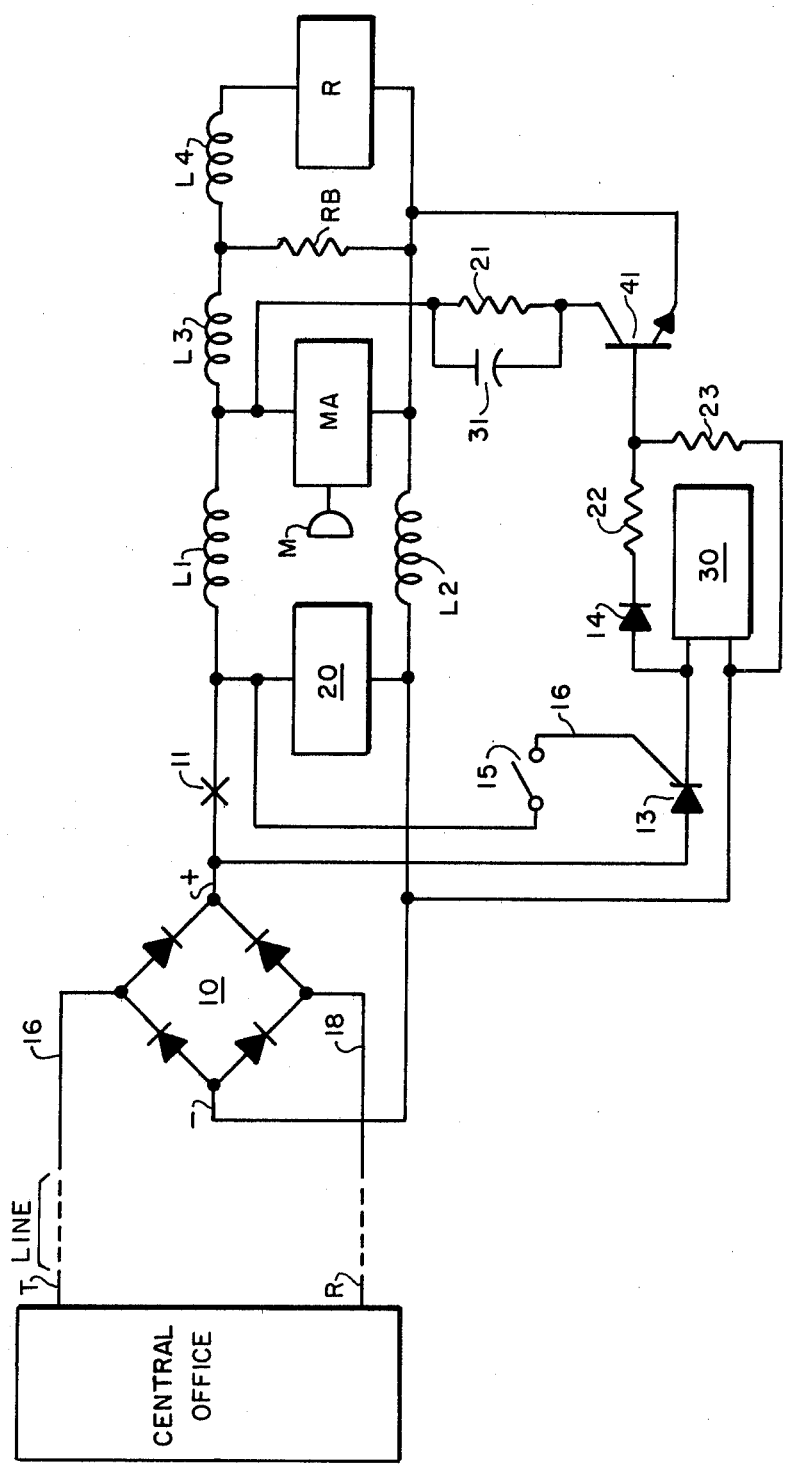

the present invention.

TELEPHONE SUBSTATION TRANSMITTER MUTING CIRCUIT

FIELD OF THE INVENTION

This invention relates in general to muting circuits and more particularly to a handset transmitter muting circuit for a telephone substation having a hold function.

BACKGROUND OF THE INVENTION

In a telephone substation where a hold circuit is implemented, the user may, by manipulating a hold button shunt or hold a received call until a desired party is called to the telephone or is transferred to another local extension. The holding circuit is essentially a shunting circuit which simulates the electrical characteristics of the subscriber's local telephone instrument. This allows the handset to be placed "on-hook," disconnecting the transmission circuit from the line.

It is often convenient for the substation user to use the hold function merely to mute the handset transmitter thereby, keeping a called party from hearing the conversation in the user's immediate area. In order to mute the handset transmitter in a substation having a hold function, the handset would have to be replaced "on-hook." Accordingly, any substation connected to the same line would drop the hold when taken "off-hook," increasing the chance of the call being lost.

Activating the hold and placing the handset on a desk or any other hard flat surface would ensure that the hold would not be inadvertently lost, however the handset transmitter is not disconnected since the substation is "off-hook." Consequently, conversation in the user's area can be heard through the handset transmitter and feedback squeal would develop.

Therefore, the present invention mutes the handset transmitter in substations incorporating a hold circuit allowing the hold circuit to be used as merely a muting circuit when the handset is "off-hook."

SUMMARY OF THE INVENTION

The transmitter muting circuit of the present invention is intended to be used in a subscriber's substation which also includes a hold circuit and a transmission circuit. The transmission circuit includes a handset transmitter and a hookswitch contact with the hookswitch contact connecting the transmission circuit to a central office and a central office battery via a subscriber's line.

First switching means comprising a silicon controlled rectifier (SCR) is triggered into forward conduction through a user operated pushbutton, which applies the potential of the positive terminal to the hold circuit turning the hold circuit on. With the hold circuit activated the subscriber's line is seized.

Second switching means comprising a transistor, is turned on responsive to the SCR going into forward conduction. The transistor connects a transmitter muting path comprising a resistor and capacitor across the handset transmitter. The muting path effectively lowers the handset transmitter's gain, muting the handset transmitter.

DESCRIPTION OF THE DRAWING

The single sheet of drawing included herewith comprises a schematic diagram of the improved transmitter muting circuit embodying the principles of operation of the present invention.

DESCRIPTION OF THE PREFERRED EMBODIMENT

The included drawing schematically shows the transmitter muting circuit and those elements well known and common to a subscriber station which will hereinafter be described in detail.

The subscriber station transmission circuit includes a transformer having coils L1, L2, L3 and L4, handset receiver R, and a handset transmitter consisting of a microphone M and a microphone amplifier MA. A balancing network normally comprised of resistors, varistors and capacitors is represented by resistor RB for matters of simplicity. Dialing signals are produced and applied to the transmission circuit by signaling generator 20. Diode bridge 10 connects the positive and negative terminals of the transmission circuit to a central office and a central office battery (not shown), via subscriber station leads 16 and 18 and the tip (T) and ring (R) leads, respectively, of the subscriber's line. The positive terminal includes a hookswitch contact 11 which when made, completes a loop circuit from the central office battery to the subscriber line and the transmission circuit. The subscriber station further includes a hold circuit 30 connected in parallel across the transmission circuit, disposed to seize the subscriber's line when switch 15 is activated. Switch 15 provides trigger current via trigger lead 16 to silicon controlled rectifier (SCR) 13, which drives SCR 13 into forward conduction thereby, connecting the positive terminal to the hold circuit. The hold circuit simulates the electrical characteristics of the transmission circuit, allowing the transmission circuit to be disconnected from the line.

The muting circuit of the present invention comprises a transistor 41 having its base lead connected to the positive terminal via diode 14 and resistor 22, and to the negative terminal via resistor 23. A shunting path is provided across microphone M and microphone amplifier MA from the positive terminal of the transmission circuit through resistor 21 and capacitor 31 the collector-emitter path of transistor 41 to the negative terminal of the transmission circuit.

It should be noted that the included drawing shows all contacts in their unoperated conditions. Hookswitch contact 11 is controlled by a typical hookswitch mechanism which is manually operable into an operated or "off-hook" condition; i.e. when the handset is lifted off the subscriber station, or a non-operated "on-hook" condition; i.e. when the handset is placed on the subscriber's station.

A description of the operation of the transmitter muting circuit will be hereinafter described in detail.

With hookswitch 11 made, such as when a subscriber picks up the handset, the transmission circuit is connected to the subscriber's line allowing the subscriber to place or receive telephone calls. When the subscriber wishes to place a called or calling party temporarily on hold he momentarily depresses switch 15 connecting the positive terminal to SCR trigger lead 16 placing SCR 13 into forward conduction, activating the hold circuit and seizing the subscriber's line. A more detailed explanation of the hold circuit operation may be had by reference to co-pending U.S. patent application Ser. No. 444,759 having a common assignee.

The positive potential of the positive terminal is also applied to the base lead of transistor 41 through SCR 13, diode 14 and resistor 22. Transistor 41 subsequently is switched into saturation which connects the DC shunt path comprising resistor 21 across the microphone amplifier MA. The DC shunt lowers the microphone amplifier gain, effectively muting the handset transmitter. Capacitor 31 shunts the AC output of the microphone amplifier MA back to its common terminal thereby reducing the net amplifier AC output substantially. The handset may then be placed on a desk or flat surface without fear of feedback developing or the held party hearing conversations in the users area. When the hold is dropped, silicon controlled rectifier 13 turns off thereby, disconnecting the hold circuit from the positive terminal. Diode 14 and resistor 22 are also cut off from the positive terminal thereby turning off transistor 41. A negative bias from the negative terminal through resistor 23 ensures low current leakage through transistor 41 in the off state. With transistor 41 off the shunt circuit is disconnected from the microphone amplifier MA, allowing the handset to be used in the usual manner.

With the muting circuit disconnected, diode 14 prevents any reverse base-emitter current which may flow through transistor 41 during dialing, from falsely turning on the hold circuit.

Although the best mode contemplated for carrying out the present invention has been herein shown and described it will be apparent that modifications and variations may be made without departing from what is regarded as the subject matter of the invention.

What is claimed is:

1. A transmitter muting circuit for use in a subscriber substation said subscriber station including a hold circuit and a transmission circuit having a positive and a negative terminal, a handset transmitter, and a hookswitch contact, said contact connecting said transmission circuit to a central office and a central office battery via a subscriber line completing a loop circuit extending over said subscriber line for transmission of battery current and voltage to said transmission circuit, said transmitter muting circuit comprising:

first switching means manually operated connecting said hold circuit to said loop circuit activating said hold circuit and seizing said subscriber line; and, second switching means connecting a transmitter muting path across said handset transmitter in response to said first switching means, muting said handset transmitter.

2. The transmitter muting circuit as claimed in claim 1, wherein: said hold circuit includes first and second leads and said second lead is connected to said transmission circuit negative lead and said hold circuit first lead is connected to said transmission circuit positive lead through said first switching means, said first switching means comprising a silicon controlled rectifier including a trigger lead connected to a manually operated switch connecting said trigger lead to said transmission circuit positive terminal thereby placing said silicon controlled rectifier into forward conduction and activating said hold circuit.

3. The transmitter muting circuit as claimed in claim 2, wherein: said second switching means comprises a transistor having its base lead connected to said hold circuit first lead through a diode and a resistor, said diode and resistor arranged to provide base current to said transistor turning on said transistor when said hold circuit is activated.

4. The transmitter muting circuit as claimed in claim 3, wherein: said transmitter muting path is connected across said handset transmitter through said transistor device collector-emitter path when said transistor is turned on.

5. The transmitter muting circuit as claimed in claim 1, wherein: said handset transmitter includes a microphone and a microphone amplifier and said transmitter shunting path comprises a resistor and a capacitor connected across said microphone amplifier decreasing said microphone amplifier's gain and output.

6. The transmitter muting circuit as claimed in claim 3, wherein: said transistor device base lead is further connected to said hold circuit second lead through a resistor whereby a negative bias supplied to said transistors base lead when said hold circuit is turned off.

7. A transmitter muting circuit for use in a subscriber station said subscriber station including a hold circuit and a transmission circuit having a positive and a negative terminal, a handset transmitter, and a hookswitch contact, said contact connecting said transmission circuit to a central office and a central office battery via a subscriber line completing a loop circuit extending over said subscriber line for transmission of battery current and voltage to said transmission circuit, said transmitter muting circuit comprising:

a silicon controlled rectifier connecting said hold circuit across said transmission circuit, said silicon controlled rectifier including a trigger lead and said trigger lead connected to said positive terminal placing said silicon controlled rectifier into forward conduction and activating said hold circuit; and, a switching device connecting a transmitter muting path across said handset transmitter in response to said hold circuit, muting said handset transmitter.

8. The transmitter muting circuit as claimed in claim 7, wherein: said hold circuit includes first and second leads said first lead connected through said silicon controlled rectifier to said positive terminal and said second lead connected to said negative terminal, and said switching device comprises a transistor having its base lead connected to said hold circuit first lead via a diode and resistor, whereby said diode and resistor provide said transistor with base current turning on said transistor when said hold circuit is activated.

9. The transmitter muting circuit as claimed in claim 8, wherein: said handset transmitter comprises a microphone and microphone amplifier and said transmitter muting path comprises a resistor and capacitor connected across said microphone amplifier through said transistor collector-emitter path when said transistor is turned on thereby lowering said microphone amplifier's gain and output.

10. The transmitter muting circuit as claimed in claim 8, wherein: said transistor base lead is further connected through a resistor to said hold circuit second lead providing a negative bias to said transistor ensuring transistor cutoff when said hold circuit is deactivated.

* * * * *